April 6, 1937.  C. D. RYDER  2,076,044
LIGHT REFLECTING MEANS
Filed May 7, 1935
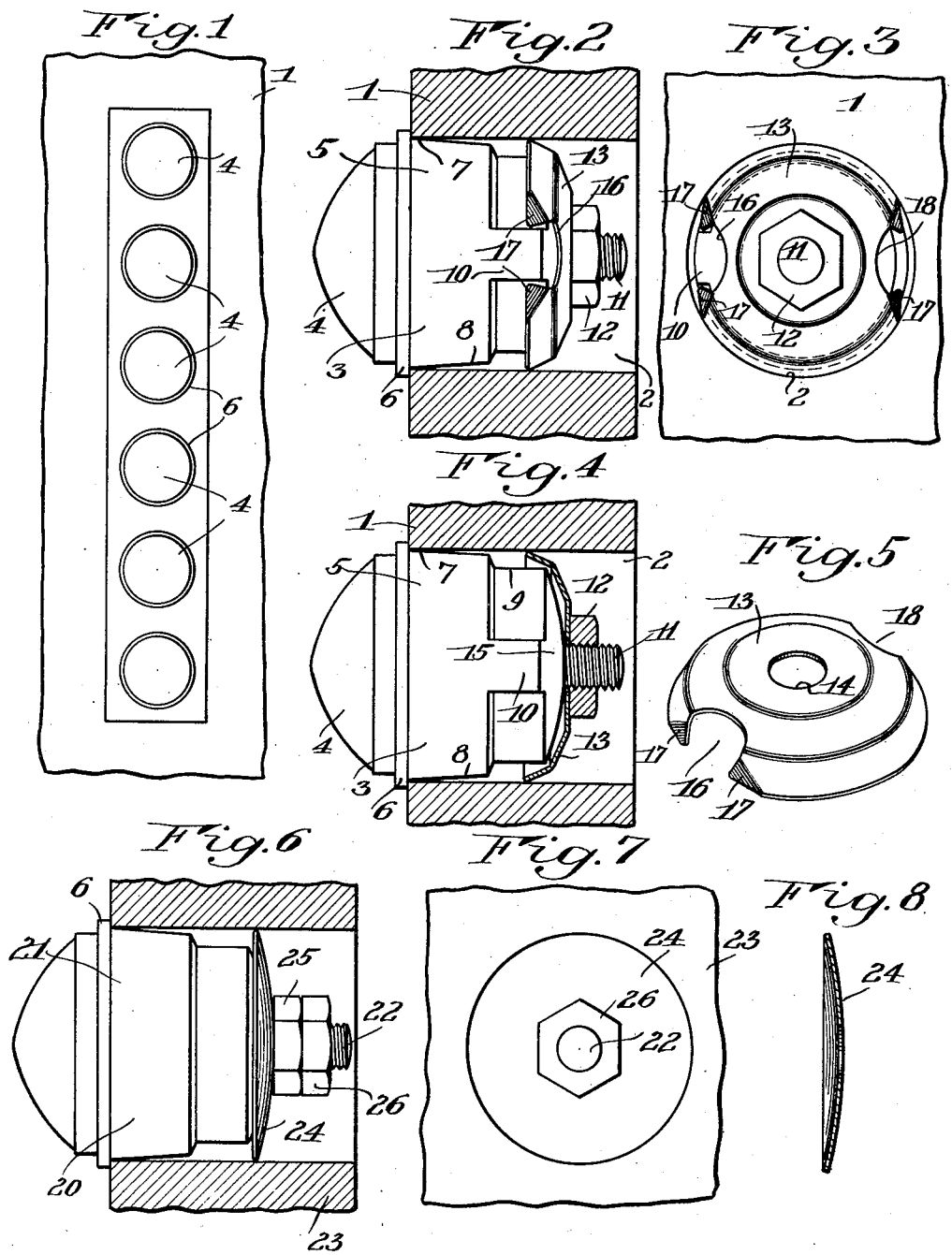
INVENTOR
Charles Daniel Ryder
BY Edward H. Cumpston
his ATTORNEY Patented Apr. 6, 1937

2,076,044

UNITED STATES PATENT OFFICE 2,076,044

LIGHT REFLECTING MEANS

Charles Daniel Ryder, Covington, Ky., assignor to The National Colortype Company, Bellevue, Ky., a corporation of Kentucky Application May 7, 1935, Serial No. 20,133

17 Claims. (Cl. 88—82)

This invention relates to improvements in light reflecting means of the kind employed in connection with various signs arranged to be rendered visible by the light reflected from an external source. Devices of this kind may be employed in connection with warning or advertising signs and are particularly well adapted for warning signals on public highways where they are rendered visible at night by the light reflected from the headlights of approaching vehicles.

The principal object of the invention is the provision of simple, efficient and inexpensive means for mounting a light reflecting unit on a supporting member of wood, metal or other material by merely inserting it in an aperture provided therefor, said unit being automatically secured in its aperture without the use of tools or other devices.

Another object of the invention is the provision of a unitary device for securing a reflecting unit in its aperture, said device being contractible and expansible to compensate for ordinary variations in the diameters of the apertures.

Still another object of the invention is the provision of a unitary flexible device for securing a reflecting unit of this kind in its aperture, said device being so constructed as to be contracted by the walls of the aperture when inserted but sufficiently resilient to engage said walls to retain the unit in its aperture.

A still further object of the invention is the provision of a reflecting unit with a resilient cup-shaped retaining device having its outer edge separated into a plurality of parts and arranged to flex inwardly over the inner wall of an aperture in which it is inserted without injuring said wall but engaging said wall to retain the unit in the aperture when an attempt is made to move the unit in the opposite direction, said retaining device being secured to the unit by detachable means whereby the reflecting unit may be detached from its retainer and removed from the aperture, independently of the retainer and leaving the retainer resiliently seated therein.

To these and other ends the invention resides in certain improvements and combinations of parts, all as will be hereinafter more fully described, the novel features being pointed out in the claims at the end of the specification.

In the drawing:

Fig. 1 is a fragmentary front elevation of a light reflecting sign illustrating one possible embodiment of the invention;

Fig. 2 is an enlarged vertical section through one of the apertures showing a light reflecting unit mounted therein;

Fig. 3 is a rear elevation of the same;

Fig. 4 is a view similar to Fig. 2 but having parts sectioned away to expose underlying parts;

Fig. 5 is a perspective view of the securing device detached;

Fig. 6 is a view similar to Fig. 2, but illustrating another possible embodiment of the invention particularly adapted for use with a metal support;

Fig. 7 is a rear elevation of the same, and

Fig. 8 is a vertical section of the securing device detached.

Like reference numerals refer to the same parts in the several views of the drawing.

In Figs. 1 to 5 of the drawing is illustrated one possible embodiment of the invention particularly adapted to be used with a support 1, which may comprise a housing or display plate of a complete sign. In the present instance, the support is constructed of fibrous material such as wood, or the like, having reflector receiving apertures or sockets 2 formed therein. The reflector units, generally referred to by the reference numeral 3, may be of a usual or well known type, comprising a suitable lens 4, and a casing 5, in which the lens and reflecting element, not shown, are mounted. The lens casing is provided with a flange or shoulder 6 at its front end which is arranged to engage the front wall of the support and limit the inward or rearward movement of the casing in the aperture.

At its forward end adjacent to and in rear of the flange 6, as at 7, the casing is of a diameter substantially equal to the diameter of the aperture, but is substantially frusto-conical in shape and tapers or inclines inwardly away from the inner wall of the aperture toward its rear end, as at 8. At the rear of the frusto-conical wall 8, it may have a cylindrical wall, as at 9, which is separated from the wall 8 by means of a shoulder and has a spline 10 which is continuous with the wall 8 and extends rearwardly to a point at or adjacent the rear end of the housing. At its rear, the housing may be convexed as shown and has a centrally located rearwardly projecting stud 11 which may have a suitable nut 12 threaded thereon.

Arranged on the stud 11, and clamped against the rear end of the housing by the nut 12, is a retaining member generally referred to by the reference numeral 13, and illustrated in detail in Fig. 5 of the drawing. The retaining member 13 is constructed of suitable flexible or resilient material, such as brass, and is substantially cup-shaped in form so as to project forwardly over the rear part of the reduced portion of the housing where it engages the inner wall of the aperture. It is substantially free from the housing at all points except at or adjacent its central opening 14, where its inner wall is clamped against the somewhat spherical rear wall 15 of the housing by the nut 12. The member 13 has a portion of its outer margin cut away as at 16 to provide a clearance for the spline 10, and which it engages at the edges of the cut-out portion which serves to limit its turning movement on the stud. The outer edges of the walls of the cup adjacent the opening 16, as at 17, are bent or directed inwardly so as to more fully engage the spline 10 and so that the more or less sharp points at the mouth of the opening are directed away from the inner wall of the aperture. A second opening 18 similar in all respects to the opening 16 and arranged diametrically opposite the opening 16 may be provided in the member 13, to serve for convenience in assembling.

The cup-shaped member 13 is of a diameter slightly larger than the normal diameter of the aperture in which it is intended to be inserted, and since its outer wall inclines outwardly, it flexes inwardly over the inner wall of the aperture when the unit is inserted therein by reason of its engagement with said inner wall. When, however, an attempt is made to withdraw it from the aperture its outer edge tends to cut into the wall of the aperture and retains the unit firmly therein. It will be noted that the diametrically opposed openings 16 and 18 divide the outer edge of the retaining member into two parts and increase its resiliency without materially reducing its strength. It will also be noted that the retaining member serves to support the rear end of the unit centrally of the aperture so that its axis is substantially coincident with the center of the aperture. Since the outer edge of the retaining member is of greater diameter than the opening or aperture for which the unit is intended and contractible and expansible by virtue of its resiliency, it automatically compensates for slight variations in the size of the aperture, due to temperature changes or atmospheric moisture. The wall of the retaining member may be spherical or formed with a plane surface at its bottom, and a plurality of sections separated by a shoulder, as shown in the drawing. Its outer edge is substantially circular and free from outwardly projecting points so that it passes freely over the inner wall of the aperture without injuring the same, and engages said inner wall continuously throughout its circumference except for the short interruptions at the openings 16 and 18.

It is desirable that the units be detachable from the support so that old and broken units may be replaced with new ones or rearranged in the support to change the sign when desired. To this end, the casing is made to be detachable from the retaining member while mounted on the support. Access may be had to nut 12 from the rear end of the aperture from whence it may be removed from the stud 11, by means of a suitable tool, such as a T-wrench. The housing can then be removed from the front of the aperture leaving the retaining member resiliently fixed in its normal position in the aperture. The stud of a new unit may then be inserted in the centrally arranged opening 14 of the retaining member and the nut replaced from the rear end. If it is desired to remove the unit with its retaining member and mount it in another aperture, either in the same or a different support, the instrument with which the nut 12 was removed may be inserted in the aperture from the front side of the support and used to push the retaining member from the rear end of the aperture in which direction it is readily movable on account of its resiliency and form.

It will be noted that simple and efficient retaining means have been provided for mounting a reflecting unit in a wooden support, which is automatic in action, does not cut or otherwise injure the inner wall of the aperture, and from which the reflecting unit may be separated or detached leaving the retaining member in the aperture.

Referring now particularly to the embodiment of the invention illustrated in Figs. 6, 7, and 8 of the drawing, in which 20 represents a reflecting unit having a casing 21, and a centrally arranged rearwardly projecting stud 22. Except for the omission of the spline 10, these parts are substantially like those previously described and need not be again described in detail. This unit is adapted to be mounted in an aperture or opening in a metal support 23 which may be of cast iron or other preferred material of a similar nature.

In the present instance a retaining member 24 has a centrally arranged opening for the passage therethrough of the stud 22, and is secured to and clamped against the rear end of the reflector casing by means of the nut 25 which may be locked in position with a lock nut 26 in a well known manner. In the present instance, the retaining member 24 is cup-shaped or concavo-convex in form, and only slightly greater in diameter than the inner diameter of the aperture, or opening in the support. Its open side faces forwardly and it is constructed of the same resilient, flexible material as the retaining member 13 previously described. Thus constructed it inclines forwardly and outwardly from the stud 22 into resilient engagement with the inner wall of the aperture in which the unit is mounted.

As in the previously described embodiment of the invention, the reflecting unit with its retaining device secured thereto may be easily inserted in an aperture provided therefor, the outer edge of the retaining device flexing away from the inner wall of the aperture by engagement therewith, its inward movement being limited by the flange or collar 6 which moves into engagement with the outer wall of the support. When an attempt is made to move the unit outwardly in a reverse direction the retaining member expands into engagement with the inner wall of the aperture and retains the unit therein. The reflecting unit may, however, be removed from the support by detaching it from the retaining member by removing the nuts 25 and 26 with a suitable tool from the rear end of the aperture, when the unit may be withdrawn forwardly leaving the retaining member positioned in the aperture in resilient engagement with its inner wall. A new unit may now be inserted in the aperture and secured to the retaining member by the nuts 25 and 26, or the retaining member may be pushed from the rear end of the aperture, its outer edge flexing over the inner wall thereof.

It will be noted that a retaining member is provided for a reflecting unit which may be inserted in an aperture provided therefor and which securely retains the unit in its aperture without the use of tools of any kind and which does not cut or scratch, or in any way injure the inner wall of the aperture.

Although only two of many possible embodiments of the invention are shown and described herein, it will be understood that this application is intended to cover such other changes or modifications as come within the spirit of the invention or scope of the following claims.

I claim:

1. In a light reflecting sign, the combination with a support having an aperture therein, of a light reflecting unit the greater portion of which is disposed within said aperture, and a retaining member on said unit substantially enclosed within the aperture, said retaining member being resilient and having portions of its outer edge cut away to separate it into a plurality of parts the extremities of which are inclined in a direction away from the unit and in engagement with the inner wall of the aperture and being flexed inwardly thereby when the unit is inserted therein and resiliently engaging said inner wall intermediate the ends of the aperture to retain the unit therein.

2. In light reflecting means, the combination with a support having an aperture therein, of a light reflecting unit within the aperture with its rear end terminating therein, a retaining member on said unit, said retaining member being resilient and having a curved outer edge in engagement with the inner wall of the aperture circumferentially and flexed inwardly thereby when the unit is inserted within the aperture and engaging said inner wall between the ends of the aperture to retain the unit within the aperture, and interlocking means on the unit and retaining member for securing them against relative turning movement.

3. In a light reflecting sign, the combination with a support having an aperture therein, of a light reflecting unit within the aperture, a retaining member on said unit, said retaining member being resilient and having a curved outer edge engaging the inner wall of the aperture and flexed inwardly thereby when the unit is inserted within the aperture and engaging said inner wall between the ends of the aperture to retain the unit within the aperture, and means for securing the unit to the retaining member comprising a detachable part on the unit disposed rearwardly of the retaining member whereby the unit may be detached from the retaining member when the latter is seated within the aperture.

4. In a light reflecting sign, the combination with a support having an aperture therein, of a light reflecting unit within the aperture, a retaining member on said unit, said retaining member being resilient and having a curved outer edge engaging the inner wall of the aperture and flexed inwardly thereby when the unit is inserted within the aperture, said curved outer edge engaging said inner wall intermediate the ends of the aperture to retain the unit within the aperture, and detachable means on the rear end of the unit for clamping the retaining member in engagement therewith, said detachable means being disposed rearwardly of the retaining member.

5. In a light reflecting sign, the combination with a support having an aperture therein, of a light reflecting unit within the aperture comprising a casing having an outer wall inclined inwardly away from the inner wall of the aperture, and a substantially circular retaining member inclined outwardly and forwardly from the rear end of the unit and engaging the inner wall of and terminating within the aperture to retain the axis of the unit substantially centrally of the aperture, said casing and retaining member being insertable within the aperture as a unit.

6. In a light reflecting sign, the combination with a support having an aperture therein, of a light reflecting unit within the aperture having a threaded rear end portion, a retaining member within the aperture on said threaded portion having its outer edge curved to conform substantially to the curvature of the inner wall of the aperture and adapted to move freely over the inner wall of the aperture without injury thereto when the unit is moved rearwardly therein, and a nut on said threaded end portion for securing the retaining member thereon.

7. A light reflecting unit adapted to be inserted in the aperture of a support and including a casing, and a resilient retaining member mounted on the rear end of the casing and including spaced forwardly extending curved walls having their extremities inclined in a direction away from the casing, said extremities being adapted to yieldingly engage the inner wall of the aperture when the unit is inserted therein and adapted to grip the wall of the aperture to hold the unit against outward withdrawal from the aperture.

8. A light reflecting unit adapted to be inserted within the aperture of a support and comprising a casing, a stud projecting from the rear end of the casing, and a resilient cup-shaped retaining member detachably mounted on said stud, said retaining member having its walls inclined outwardly and forwardly from the stud and substantially surrounding the rear end of the casing and arranged to resiliently engage the inner wall of the aperture when the unit is inserted therein.

9. A light reflecting unit adapted to be inserted within the aperture of a support and comprising a casing, a stud projecting from the rear end of the casing, a resilient retaining member mounted on said stud, said retaining member having its walls inclined outwardly and forwardly from the stud and having a substantially circular outer edge surrounding the rear end of the casing for yielding engagement with the wall of said aperture, and interengaging means on the casing and retaining member for securing the latter against rotation on the stud.

10. A light reflecting sign comprising a support having an aperture therein, a light reflecting unit within the aperture comprising a casing having means adjacent its forward end for engaging the support to limit its rearward movement within the aperture, said casing including a rearwardly and inwardly inclined outer wall substantially enclosed within the aperture, and a resilient retaining member mounted on the rear end of said casing and terminating short of the front end of the aperture with its side wall inclined outwardly and forwardly and having a circular outer edge resiliently engaging the inner wall of the aperture.

11. A light reflecting unit comprising a body portion adapted to be inserted in the aperture of a support, said body portion having a reduced rear end portion for extension within the aperture, and a resilient substantially cup-shaped retaining member mounted on said reduced rear end portion of the unit and terminating short of the front end of said body portion, said retaining member having diametrically opposite openings in its outer wall to augment its resiliency, the outer edges of said wall being adapted to resiliently engage the inner wall of the aperture.

12. A light reflecting element for insertion within an aperture of a support including a casing having means adjacent its front end for limiting its movement rearwardly within the aperture, said casing including a rearwardly and inwardly inclined outer wall for extension within the aperture, and a resilient substantially cup-shaped member mounted on the casing at the rear end of said wall and having a forwardly extending outwardly flared circular portion adapted to terminate short of the front end of said aperture when the light reflecting element is positioned therein and affording a relatively thin edge for contacting the wall of the aperture between the ends of the latter to hold said member against outward movement within the aperture, said light reflecting element and said cup-shaped member being insertable as a unit within the aperture by moving it rearwardly therein.

13. A light reflecting element for insertion within an aperture of a support including a casing having means adjacent its front end for limiting its movement rearwardly within the aperture, said casing including a rearwardly and inwardly inclined outer wall for extension within the aperture, a resilient substantially cup-shaped member mounted on the casing at the rear end of said wall and having a forwardly extending outwardly flared circular portion adapted to terminate short of the front end of said aperture when the light reflecting element is positioned therein and affording a relatively thin edge for contacting the wall of the aperture between the ends of the latter to hold said member against outward movement within the aperture, said light reflecting element and said cup-shaped member being insertable as a unit within the aperture by moving it rearwardly therein, and a part for securing the cup-shaped member upon said reflecting element, said part being movable upon the reflecting element within the aperture to release the reflecting element for outward withdrawal from the aperture.

14. A light reflecting element adapted to be inserted within an aperture of a supporting member and including a casing having a flange for limiting its movement rearwardly within the aperture through engagement with the supporting member, a resilient cup-shaped retaining member substantially surrounding the rear end of the casing and flared outwardly and extending forwardly therefrom with its front edge portion inclined in a direction away from said casing and adapted for contact with the wall of the aperture intermediate the ends of the aperture when the unit is in assembled position upon the supporting member, said element and retaining member being insertable within the aperture as a unit, and means detachably securing the retaining member upon said element.

15. In light reflecting means, the combination with a support having an aperture therein, of a light reflecting unit having a body portion disposed within the aperture, said unit having an abutment engaging the support to limit movement of the unit rearwardly within the aperture, and a retaining member mounted on said body portion independently of the abutment and including forwardly extending flexible walls having spaced free edge portions of substantial width terminating between the ends of the unit, said unit with the retaining member thereon being positioned within the aperture by moving it rearwardly therein to a position at which the abutment will engage the support, the flexible walls of the retaining member being deflected in the direction of the unit by the wall of the aperture when moving the unit within the aperture and the free edge portions of the flexible walls of the retaining member gripping the wall of the aperture between the ends thereof to hold the unit against outward withdrawal from the aperture.

16. In light reflecting means, the combination with a support having an aperture therein, of a light reflecting unit including a casing having a body portion within the aperture, said casing having an abutment engaging the support to limit the movement of the unit rearwardly within the aperture, and a retaining member mounted on the body portion of the casing independently of the abutment and including forwardly extending flexible walls inclined in a direction away from the unit and having spaced curved edges engaging the walls of the aperture between the ends of the unit and the aperture, said casing with the retaining member thereon being positioned within the aperture by moving it rearwardly therein to a position at which the abutment will engage the support, the flexible walls of the retaining member being deflected in the direction of the casing by the wall of the aperture when moving the unit within the aperture and the free curved edge portions of the retaining member gripping the wall of the aperture to hold the unit against outward withdrawal from the aperture.

17. In light reflecting means, the combination with a support having an aperture therein, of a light reflecting unit having a body portion terminating within the aperture, said unit having an abutment engaging the support to limit movement of the unit rearwardly within the aperture, a retaining member mounted on said body portion independently of the abutment and including forwardly extending flexible walls having spaced free edge portions terminating between the ends of the unit, said unit with the retaining member thereon being positioned within the aperture by moving it rearwardly therein to a position at which the abutment will engage the support, the flexible walls of the retaining member being deflected in the direction of the unit by the wall of the aperture when moving the unit within the aperture and the free edge portions of the walls of the retaining member gripping the wall of the aperture between its ends to hold the unit against outward withdrawal from the aperture, and means on the unit for holding the retaining member in assembled position thereon, said means being displaceable relative to the retaining member to allow the unit to be withdrawn from the aperture without removal of the retaining member from the aperture.

CHARLES DANIEL RYDER.